(12) United States Patent
Venkateswaran et al.

(10) Patent No.: US 11,195,142 B2
(45) Date of Patent: Dec. 7, 2021

(54) SYSTEMS AND METHODS FOR AUTOMATED CLOUD INFRASTRUCTURE OPERATIONS USING A STRUCTURED INVENTORY

(71) Applicant: JPMorgan Chase Bank, N.A., New York, NY (US)

(72) Inventors: Ramji Venkateswaran, Singapore (SG); Varun Vinod Arbatti, Singapore (SG); Deepak Sarda, Singapore (SG); Lois Blanc, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 194 days.

(21) Appl. No.: 16/359,164

(22) Filed: Mar. 20, 2019

(65) Prior Publication Data

US 2019/0295031 A1    Sep. 26, 2019

Related U.S. Application Data

(60) Provisional application No. 62/645,960, filed on Mar. 21, 2018.

(51) Int. Cl.
  *G06Q 10/08*    (2012.01)
  *G06F 16/23*    (2019.01)
(52) U.S. Cl.
  CPC ....... *G06Q 10/087* (2013.01); *G06F 16/2365* (2019.01)
(58) Field of Classification Search
  None
  See application file for complete search history.

(56) References Cited

U.S. PATENT DOCUMENTS

| | | | |
|---|---|---|---|
| 8,285,681 B2 | 10/2012 | Prahlad et al. | |
| 8,892,513 B2 | 11/2014 | Forsythe | |
| 2013/0185331 A1 | 7/2013 | Conemac | |
| 2013/0324263 A1 | 12/2013 | Ahiska et al. | |
| 2015/0134733 A1* | 5/2015 | Maturana | H04L 67/1097 709/203 |
| 2016/0371238 A1* | 12/2016 | Heavenrich | G06F 40/151 |

OTHER PUBLICATIONS

International Search Report, dated Jun. 10, 2019, from corresponding International Application No. PCT/US2019/023283.
Written Opinion of the International Searching Authority, dated Jun. 10, 2019, from corresponding International Application No. PCT/US2019/023283.

* cited by examiner

*Primary Examiner* — Paul Danneman
(74) *Attorney, Agent, or Firm* — Greenberg Traurig LLP

(57) ABSTRACT

Systems and methods for automated cloud infrastructure operations using a structured inventory are disclosed. In one embodiment, in an information processing apparatus comprising at least one computer processor, a method for automated cloud infrastructure operations using a structured inventory may include: (1) receiving unstructured data from a platform, wherein the unstructured data comprises unstructured inventory operational data; (2) transforming the unstructured data into structured data; (3) identifying at least some of the structured data as emerging reference data based on a request for at least some of the structured data; (4) providing at least some of the emerging reference data to an inventory event stream; and (5) applying a template to the inventory event stream to generate an authoritative inventory.

18 Claims, 6 Drawing Sheets

Platform Cloud 1
Deployment X Operational Data

```
{
  "universalID": "654564-6546547-87",
  "OS-signature" : "9832749188440978236894"
  "assetType": "VM-instance",
  "state": "live",
  "updatedDateTime": "2018/02/27 12:40:06",
  "accountId": "65465789",
  "availabilityID": "amer-us-east 1a",
  "cloudProvider": "AMAZONARE",
  "cloudProviderInstanceID": "589742157",
  "cloudProviderNetworkGroup": "",
  "cloudProviderPlatformBuildIdentifier": "avi-54654",
  "computeSize": "t2.micro",
  "cores": "4",
  "cpIPAddress": "10.12.46.25",
  "diskSpace": "30TB",
  "availablediskSpace": "12.5TB",
  "gpuEnabled": "false",
  "isActive": "1",
  "memory": "12GB",
  "overlayFQDN": "j-694374.cloud.mycompany.net",
  "overlayIPAddress": " 10.12.46.26",
  "overlayNetworkGroup": "",
  "osName": "Linux",
  "platformversion": "12.2",
  "region": "us-northeast-a",
  "supportTeamName": "test",
}
```

Figure 4A

Platform Cloud 1
Deployment X Reference Data

```
{
    "DeploymentID" : "Deploymentx",
    "universalID": "654564-6546547-87",
    "assetType": "VM-instance",
    "state": "live",
    "updatedDateTime": "2018/02/27 12:40:06",
    "accountId": "65465789",
    "availabilityID": "amer-us-east 1a",
    "cloudProvider": "AMAZONAWE",
    "cloudProviderInstanceID": "169742157",
    "cloudProviderPlatformBuildIdentifier": "avi-54654",
    "computeSize": "t2.micro",
    "cores": "4",
    "cpIPAddress": "10.12.46.25",
    "diskSpace": "20TB",
    "availablediskSpace": "12.5TB",
    "gpuEnabled": "false",
    "isActive": "1",
    "memory": "12GB",
    "overlayFQDN": "j-894374.cloud.mycompany.net",
    "overlayIPAddress": " 10.12.46.26",
    "osName": "Linux",
    "platformversion": "12.2",
    "region": "us-northeast-a",
    "supportTeamName": "test",
}
```

Figure 4B

Platform Cloud 1
Deployment X FIRMWIDE Reference
Data

```
{
  "firmwideID" : "QW432121",
  "platformID" : "Cloud1",
  "cyberOwner" : "foxtrot-charlie",
  "DeploymentID" : "DeploymentX",
  "universalID": "654564-6546547-87",
  "assetType": "VM-instance",
  "state": "live",
  "updatedDateTime": "2018/02/27 12:40:06",
  "accountId": "c11-plx-65465789",
  "availabilityID": "amer-us-east-1a",
  "cloudProvider": "AMAZONAWS",
  "cloudProviderInstanceID": "s89742157",
  "cloudProviderPlatformBuildIdentifier": "avi-54654",
  "computeSize": "t2.micro",
  "cores": "4",
  "cpIPAddress": "10.12.46.25",
  "diskSpace": "20TB",
  "availablediskSpace": "12.5TB",
  "gpuEnabled": "false",
  "isActive": "1",
  "memory": "12GB",
  "overlayFQDN": "j-894374.cloud.mycompany.net",
  "overlayIPAddress": " 10.12.46.26",
  "osName": "Linux",
  "platformVersion": "12.2",
  "region": "us-northeast-a",
  "supportTeamName": "test",
}
```

Figure 4C

SYSTEMS AND METHODS FOR AUTOMATED CLOUD INFRASTRUCTURE OPERATIONS USING A STRUCTURED INVENTORY

RELATED APPLICATIONS

This application claims priority to U.S. Provisional Patent Application Ser. No. 62/645,960 filed Mar. 21, 2018, the disclosure of which is hereby incorporated, by reference, in its entirety.

BACKGROUND OF THE INVENTION

1. Field of the Invention

The present disclosure generally relates to systems and methods for automated cloud infrastructure operations using a structured inventory.

2. Description of the Related Art

Automating Cloud Infrastructure Operations is critical. Cloud infrastructure typically needs to scale at a faster pace than its operational teams (called "Devops" teams) can handle. Growing those teams proportionally to the cloud infrastructure is neither practical nor desirable. In addition, automating cloud infrastructure operations is hard as clouds need to evolve constantly in scope and scale in order to meet customer demands. Adding to the complexity of automation, cloud Devops teams are typically distributed geographically to provide support on a 24/7 basis.

Automating a cloud operation requires an inventory representing its subsystems states. Based on the inventory changes, specific operations are triggered and executed. The outcome of those operations is stored back in the inventory.

SUMMARY OF THE INVENTION

Systems and methods for automated cloud infrastructure operations using a structured inventory are disclosed. In one embodiment, in an information processing apparatus comprising at least one computer processor, a method for automated cloud infrastructure operations using a structured inventory may include: (1) receiving unstructured data from a platform, wherein the unstructured data comprises unstructured inventory operational data; (2) transforming the unstructured data into structured data; (3) identifying at least some of the structured data as emerging reference data based on a request for at least some of the structured data; (4) providing at least some of the emerging reference data to an inventory event stream; and (5) applying a template to the inventory event stream to generate an authoritative inventory.

In one embodiment, the platform may be a cloud-based platform.

In one embodiment, the structure for the unstructured data may be based on a request for the unstructured data.

In one embodiment, the request may be from an automation tool.

In one embodiment, changes to the emerging reference data may be provided as the inventory event stream.

In one embodiment, the template may be created based on the emerging reference data.

In one embodiment, the method may further include exporting the authoritative inventory to a downstream system. The downstream system may include third party systems that use the authoritative inventory.

According to another embodiment, a structured inventory system for automated cloud infrastructure operations using a structured inventory may include an operational inventory module comprising unstructured data and structured data; an inventory event stream in communication with the operational inventory module; a template-based export module in communication with the inventory event stream; and an authoritative inventory module comprising an authoritative inventory. The operational inventory module may receive the unstructured data from a data platform, wherein the unstructured data comprises unstructured inventory operational data; may transform the unstructured data into structured data; may identify at least some of the structured data as emerging reference data based on a request for at least some of the structured data; and may provide at least some of the emerging reference data to the inventory event stream. The template-based export module may apply a template to the inventory event stream to generate the authoritative inventory. The authoritative inventory module may store the authoritative inventory.

In one embodiment, the platform may include a cloud-based platform.

In one embodiment, the structure for the unstructured data may be based on a request for the unstructured data.

In one embodiment, the request may be from an automation tool.

In one embodiment, changes to the emerging reference data may be provided as the inventory event stream.

In one embodiment, the template may be created based on the emerging reference data.

In one embodiment, the template-based export module may export the authoritative inventory to a downstream system. The downstream system may include third party systems that use the authoritative inventory.

In one embodiment, the template-based export may report a success or failure of the export of the authoritative inventory.

In one embodiment, the template-based export may validate the authoritative inventory for consistency or compatibility.

BRIEF DESCRIPTION OF THE DRAWINGS

For a more complete understanding of the present invention, the objects and advantages thereof, reference is now made to the following descriptions taken in connection with the accompanying drawings in which:

FIGS. 4A, 4B, and 4C depict illustrative, non-limiting examples of unstructured (e.g., operational) data, emerging reference data and authoritative inventory, respectively, according to embodiments.

DETAILED DESCRIPTION OF PREFERRED EMBODIMENTS

Figure 1:
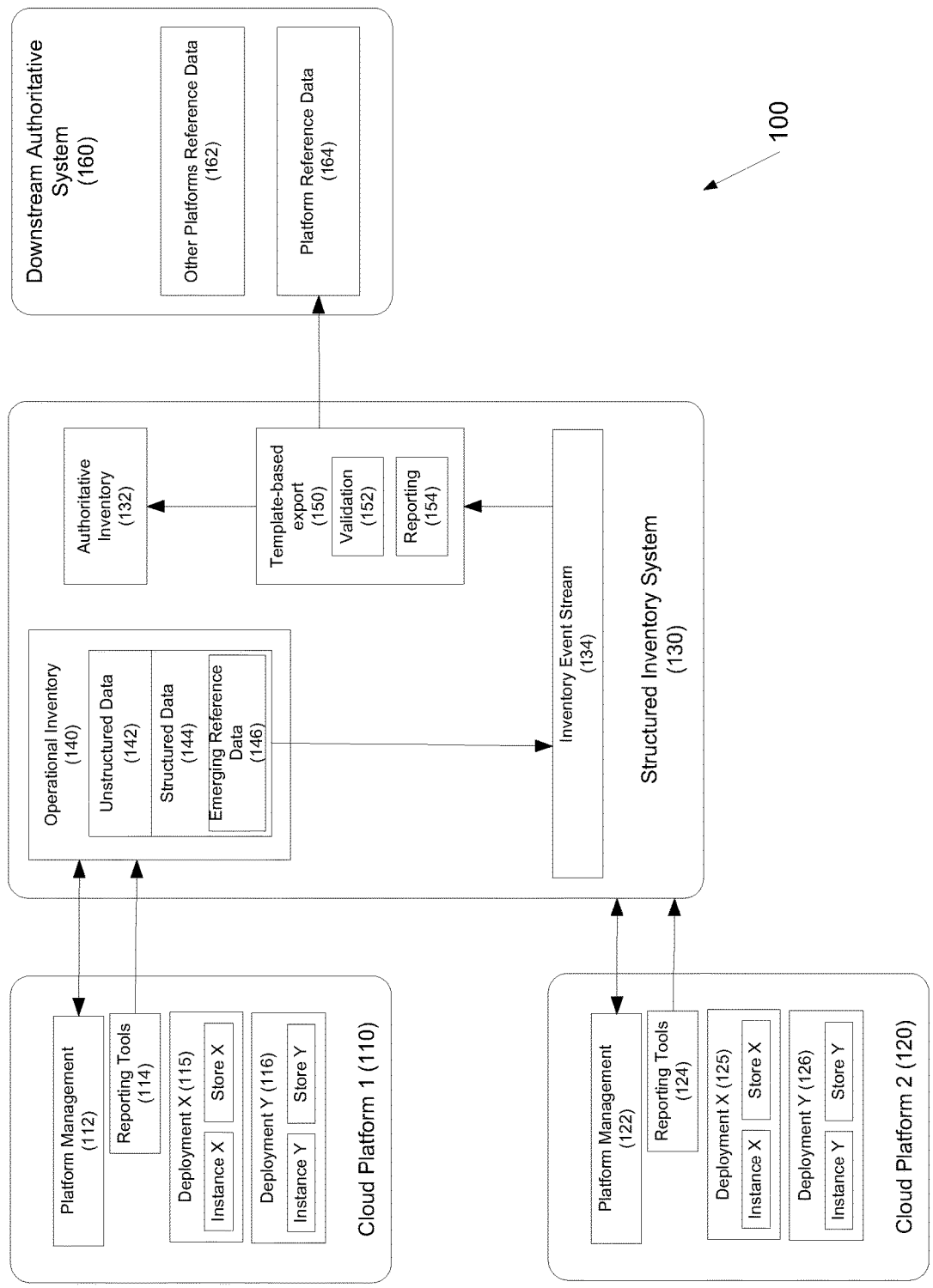
FIG. 1 depicts a system for automated cloud infrastructure operations using a structured inventory according to one embodiment.

Embodiments disclosed herein are directed to the design and use of an authoritative inventory to accelerate and ease the automation efforts of cloud devops teams.

As used herein, an authoritative inventory is the source of truth for a set of reference data.

In embodiments, the authoritative inventory may be structured in two dimensions—Dimension 1 and Dimension 2. For example, Dimension 1 may be the data type, and may identify the actual state of the system, and the desired state of the system. Dimension 2 may be the data maturity spaces, and may identify unstructured space(s), structured space(s), and authoritative inventory space(s).

Dimension 1 may allow an automation engine to define its next set of operations by comparing data of the actual system state versus the data of the desired system state. Automation may be triggered until the actual system state matches the desired system state.

Dimension 2 allows one to pragmatically and organically obtain, govern and model the inventory data, through a data refinement mechanism. For example, unstructured space may be the entry point of the data refinement mechanism. A development team (e.g., a Devops team) may store automation data in this space with minimum control and governance for the system and its owner. Each Devops team may be responsible for the data stored in this space. The unstructured space is divided into independent namespaces that each Devops team owns. Storage of data is generally easy and does not require a data model to be defined a priori.

As there is little to no friction using the unstructured space, this space is designed to be attractive for Devops teams to use to organically increase the usage of the inventory.

The data stored in the unstructured spaces may be audited (e.g., periodically, or as necessary and/or desired). Once the unstructured space is deemed mature, the unstructured space may be moved and refined into the structured space.

For structured space, one or more data models may be enforced. Changes to the data model(s) may be versioned and auditable. The data in the structured space may be explicitly curated.

The data stored in the structured spaces may also be audited (e.g., periodically, or as necessary and/or desired). Once structured space is deemed mature and relevant to, for example, other entities in an organization, the data may be refined into the authoritative inventory space.

In the authoritative inventory space, data changes may be versioned and auditable. Strict data governance processes may be in place. Relevant data may be exported to, for example, other formal inventory data stores within the organization and/or external to the organization.

In embodiments, the structured inventory may preferably be cloud-agnostic, globally available, resilient, and easy to use for Devops teams.

The structured inventory disclosed herein enables Devops teams to quickly implement their automation and feed data into the system. The data refinement process allows to curate and upgrade the data to a level of authoritative inventory. The structure of actual system state versus desired system state explicitly provides a model for cloud automation, allowing Devops team to automate faster.

Embodiments may provide some or all of the following features:

Model and processes of the structured inventory: two independent dimensions forming multiple (e.g., six) data repositories. Data refinement mechanisms between those repositories enables automation of use cases from informal/organic to formal. The structured inventory provides a model for cloud automation, and may act as an accelerator for the Devops teams.

FIG. 1 depicts an architectural diagram of a system for automated cloud infrastructure operations using a structured inventory according to one embodiment. System 100 may include cloud platforms (e.g., cloud platform 110, cloud platform 120), structured inventory system 130, and downstream authoritative systems 160. Although FIG. 1 depicts two cloud platforms 110 and 120, it should be recognized that fewer cloud platforms, or a greater number of cloud platforms, may be provided as is necessary and/or desired.

In one embodiment, cloud platforms 110, 120 may be a cloud run-time environment, a service, etc. Cloud platforms 110, 120 may be hosted by a private cloud infrastructure, or a public cloud provider, such as AWS, Azure, etc.

Similarly, although only one downstream authoritative authority is shown, it should be recognized that a greater number of downstream authoritative inventories 160 may be provided as is necessary and/or desired.

In one embodiment, cloud platform 110 may include platform management 112, reporting tools 114, and one or more deployments 115, 116. Each deployment 115, 116 may include an instance (e.g., virtual machines, data storage and compute units, sets of containers, etc.), and a store for that instance.

In one embodiment, platform management 112 may manage the lifecycle of deployments 115, 116, such as user access and entitlements, deployment configuration management, etc. Reporting tools 114 may report the sates of each of deployment 115, 116, as well as their dependencies.

In one embodiment, stores may hold application data, such as data required by the application to execute its business logic including configuration items, automation settings, end user data, reports, audit logs, etc.

Other cloud platforms, including cloud platform 120, may include similar elements.

Structured inventory system 130 may be deployed in a data center and may be executed by one or more electronic devices (e.g., computers, servers, workstations, etc.). In one embodiment, structured inventory system 130 may include unstructured inventory operational data 140, which may include emerging reference data 142. Unstructured inventory operational data 140 may receive unstructured data from platform management 112, 122 and/or reporting tools 114, 124.

In one embodiment, operational inventory 140 may include all data that is used to run an operation.

In one embodiment, emerging reference data 146 may be data that is refined into authoritative data. For example, data may be received as unstructured data, may be refined into structured data, and further refined into reference authoritative data.

For example, platform 110, 120 may use the operational data to run whatever is required by platform 110, 120 and the devops team to maintain the service.

In one embodiment, the devops team may review the data and identify the data that may be useful to share with other internal bodies, such as the cloud network address (e.g., so a security team can use the data to identify an external attack); physical installation dates (e.g., so an accounting team can calculate the depreciation of the physical asset); a dictionary of performance metrics (e.g., so the platform can be compared to other platforms); etc.

Structured inventory system 130 may further include inventory event stream 134. For example, inventory event stream 134 may decouple the export of reference data in the authoritative space from the data store. This allows inventory changes to be captured and retained as they happen even if the source and/or destination are temporarily unavailable.

Coupling the export of reference data in the authoritative space may increase risk as an increase of consumption by authoritative inventory 132 may impact the performance of the operational data, and may slow down the automation, as a result potentially lead to a distributed denial of service of platform 110, 120.

Structured inventory system 130 may further include template-based export component 150, which may receive data from inventory event stream 134. Template-based export component 150 may include validation component 152 and reporting component 154. Template-based export component 150 may apply a template for an authoritative inventory to the data from the inventory event stream 134, and may validate the data using validation component 152. In one embodiment, validation component 152 may validate the data for consistency, cross-reference, compatibility, etc.

In one embodiment, template(s) may be defined by a user based on what is needed to be known about platforms 110, 120, etc. In another embodiment, machine learning may be used to define the template(s).

In one embodiment, reporting component 154 may report the success or failure for each entity exported to the reference data. For a failed export, reconciliation may be required.

After the data is validated and a template is applied, the data may be stored as authoritative inventory 132. In one embodiment, authoritative inventory 132 may be stored in a database.

Downstream authoritative system 160 may receive an export of authoritative inventory 132. Examples of downstream authoritative system(s) 160 may include cybersecurity systems, deployment viewers (e.g., to provide a view of an end-user's deployments), infrastructure, accounting, identity, entitlement inventories, etc. Any suitable downstream system 160 may receive an export of authoritative inventory 132.

An illustrative, non-limiting example of the emergence process for a unit of data "network switch firmware revision number" is as follows. Initially, the network switch firmware revision number is used only by the devops team to upgrade the switches in a timely manner. It is unstructured data 142 is used within operational inventory 140.

An example of unstructured data 142 is: Instance X {Network_switch_firm_ver: 6.1}; Store X {Net_switch_ver_firm: 6.1}; Instance Y {Network_switch-_firm_ver: 6.2}; Store Y {Net_switch_ver_firm}. Notably, the data is unstructured as it does not have a common format.

In order to expand the use of this data, and to facilitate its use by automation tooling, the team may move "network switch firmware revision number" data to a structured space, and enforce consistency with a structure or format for the data. Thus, the data will have the same format, and all instances and stores will have to include it in that format. For example, unstructured data 142 may be formatted as: Instance X {NETFIRMVER: v6.1}; Store X {NETFIRMVER: v6.1}; Instance Y {NETFIRMVER: v6.2}; Store Y {NETFIRMVER: v6.2}. This structured data is stored as structured data 144.

As other teams and entities (e.g., external teams) request to consume the structured data (e.g., the network switch firmware) in structured data 144, it may be identified or classified as emerging reference data 146. Any structured data may be classified as emerging reference data.

As an organization decides that emerging reference data 146 is to become part of the organization's authoritative data inventory 132, but in a different format (e.g., "{SOURCE: {NETWORKFIRMWARE: MAJ REV N, MINOR REV M}}," the team may push all changes of "network switch firmware revision number" to inventory event stream 134; capture those changes in template-based export 150; validates that the data matches the expected format with validation 152, transforms the data into the new format (e.g., {Instance X: {NETWORKFIRMWARE: MAJ REV 6, MINOR REV 1}}; {Store X: {NETWORKFIRMWARE: MAJ REV 6, MINOR REV 1}}; {Instance Y: {NETWORKFIRMWARE: MAJ REV 6, MINOR REV 2}}; {Store Y: {NETWORKFIRMWARE: MAJ REV 6, MINOR REV 2}}), and exports it to authoritative inventory 132.

At this point the data is considered authoritative—it is the absolute source of authority in the organization for this data.

The devops team may make any adjustment(s) to propagate this data to the downstream authoritative systems.

Figure 2:
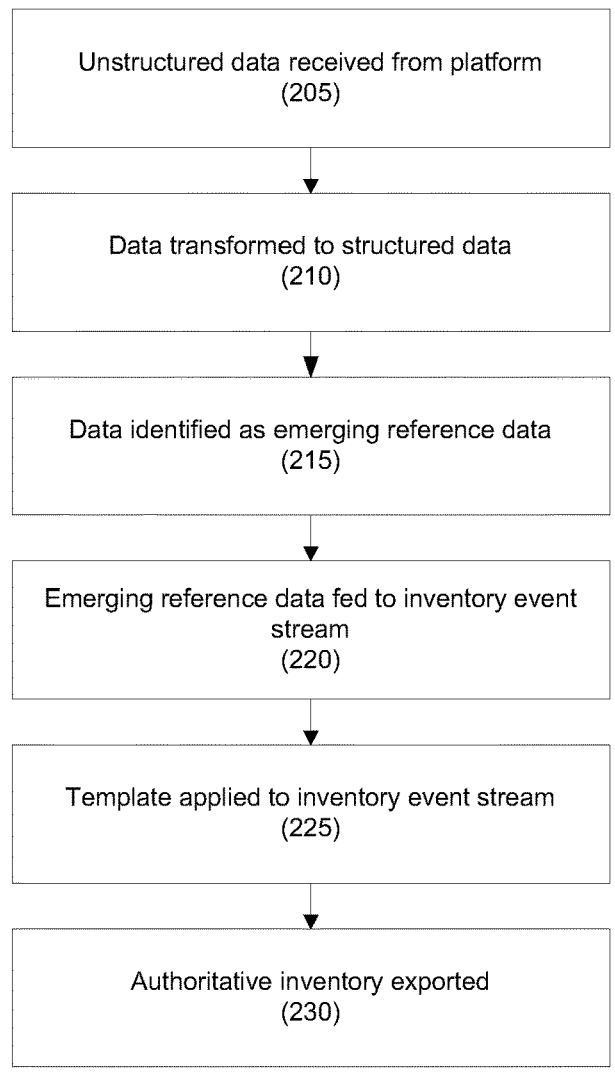
FIG. 2 depicts a method for automated cloud infrastructure operations using a structured inventory according to one embodiment and FIG. 3 depicts data types (e.g., actual state data and desired state data), as well as the data refinement dimensions (e.g., unstructured space, structured space, and authoritative inventory space) according to embodiments.

FIG. 2 depicts a method for generating a structured inventory for automated cloud infrastructure operations. In step 205, unstructured data may be provided from a platform to a structured inventory system as unstructured inventory operational data. The data may be provided by a cloud platform's platform management, reporting tools, etc. In one embodiment, the data may be sent encrypted. The data may be unstructured, but may be described using the JSON document format. Triggers may include, for example, platform state changes or timer based (refresh).

In one embodiment, the unstructured data may include data that is deemed necessary to run the deployments X, Y, such as the name of the machine on which the deployment is hosted, name of container, audit data, etc. The types and amount of unstructured data may depend on the complexity of the deployment.

In one embodiment, data may be provided by reporting tools that may be provided on the platforms being monitored.

In step 210, the unstructured data may be transformed structured data. In one embodiment, the unstructured data to be transformed, and the structure for the data, may be selected by a human. In another embodiment, the unstructured data may be selected to be transformed using machine learning, and may be based on requests for the unstructured data. The requests may be from automation tools.

In one embodiment, the data structure may be selected for standardization.

In step 215, some of the structured data may be identified or classified as emerging reference data. In one embodiment, the structured data may be made available as emerging reference data based on, for example, requests for the structured data. Other bases for the structured data being identified as emerging reference data may be used as is necessary and/or desired.

In step 220, the emerging reference data may be provided to an inventory event stream. In one embodiment, changes to the emerging reference data may be published in the inventory event stream. In one embodiment, structured, non-emerging reference data may further be published in the inventory event stream.

In step 225, the data from the inventory event stream may be formatted according to a template for the organization's authoritative inventory. In one embodiment, the templates may be pre-existing, and the emerging reference data in the inventory event stream may be formatted to comply with the template. In another embodiment, the template may be created as the emerging reference data is received.

In step 225, the authoritative inventory may be exported to one or more downstream systems that may use the authoritative inventory.

Figure 3:
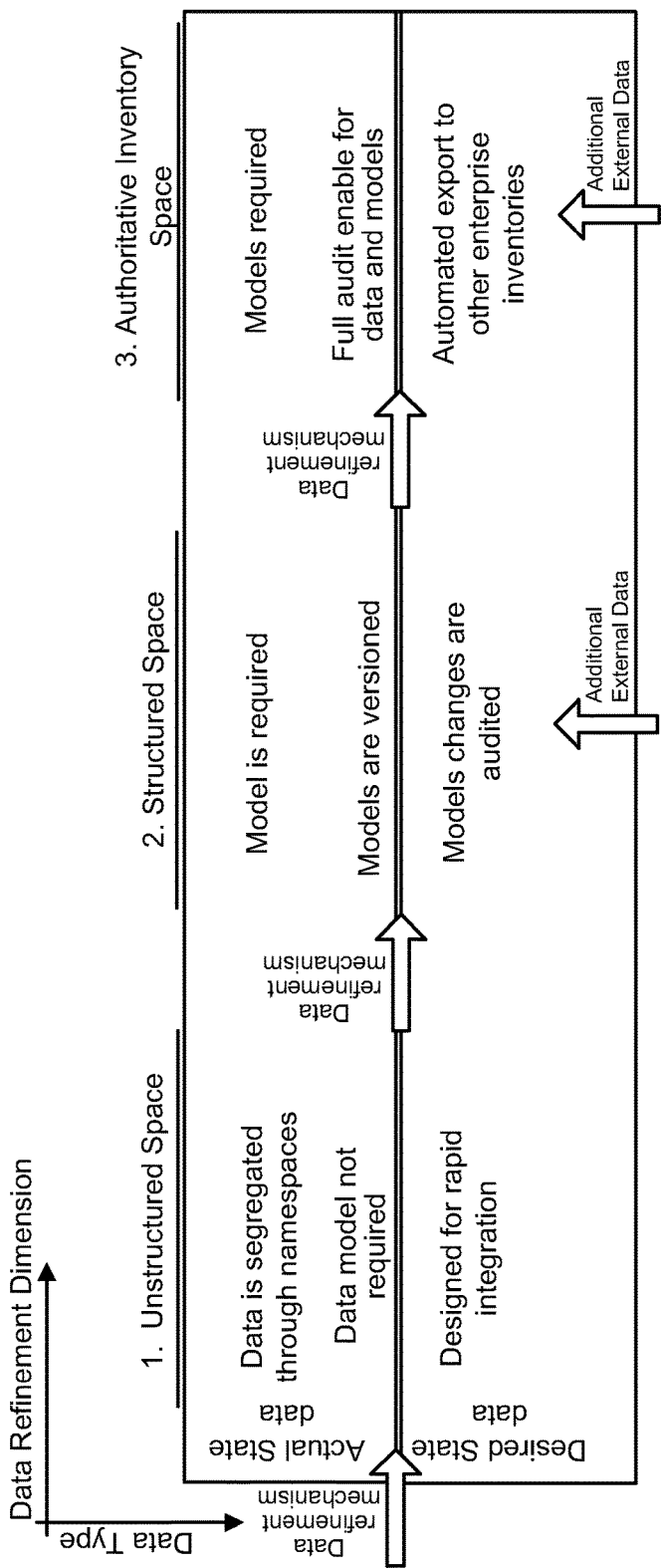

FIG. 3 depicts data types (e.g., actual state data and desired state data), as well as the data refinement dimensions (e.g., unstructured space, structured space, and authoritative inventory space) according to embodiments. The characteristics for each data type and refinement dimension are illustrated in the figure.

Embodiments may store data in separated spaces—unstructured, structured, and authoritative spaces, and may store "actual state" and "desired state" data. In one embodiment, a refinement mechanism may be provided between the spaces.

As the devops teams work on implementing automation, they add, update and remove new data to the unstructured store. The teams may achieve better understanding of what data is absolutely required to automate the system. For example, the authentication devops team may realize "We maintain in our unstructured store the data A, B and C. However we will always need the data A, whereas the data B and C are just nice to have."

In addition, other/external depending teams may leverage the unstructured store of another team may require the guarantee the presence of key data. For example, the compute devops team may tell the authentication Devops team: "We saw you are exposing the data A, B and C in your unstructured store. We are using your data C in our deployment automation, please maintain it!"

Those requirements may be formalized in the structured store. For example, the authentication Devops team may define that their structured store will maintain always the data A and C, and that B is optional.

The same mechanism may be used to promote and refine data between the structured space and authoritative space.

In embodiments, new, external requirements may further define the structured and authoritative spaces: internal and external audit and compliance data, interoperability data with the other authoritative spaces. For example, the authentication devops team may add an organization inventory unique id into the assets stored into its authoritative space. This id may be be used to sync the assets with the other inventories in the organization.

Referring to FIGS. 4A-4C, illustrative, non-limiting examples of unstructured (e.g., operational) data, emerging reference data and authoritative inventory are provided, respectively, according to embodiments. The unstructured data in FIG. 4A may be transformed into emerging reference data by excluding "OS-signature" and "overlayNetworkGroup." "DeploymentID" may be added.

To transform the emerging reference data into the authoritative inventory, the "supportTeamName" may be excluded, and "firmwideID," "platformID," and "cyberOwner," may be added. And "accountID" may be augmented with additional data.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for automated cloud infrastructure operations using a structured inventory, comprising:
   in an information processing apparatus comprising at least one computer processor:
   receiving unstructured data from a platform, wherein the unstructured data comprises unstructured inventory operational data;
   transforming the unstructured data into structured data;
   identifying at least some of the structured data as emerging reference data based on a request for at least some of the structured data;
   providing at least some of the emerging reference data to an inventory event stream; and
   applying a template to the inventory event stream to generate an authoritative inventory.

2. The method of claim 1, wherein the platform comprises a cloud-based platform.

3. The method of claim 1, wherein the structure for the unstructured data is based on a request for the unstructured data.

4. The method of claim 3, wherein the request is from an automation tool.

5. The method of claim 1, wherein changes to the emerging reference data are provided as the inventory event stream.

6. The method of claim 1, wherein the template is created based on the emerging reference data.

7. The method of claim 1, further comprising:
   exporting the authoritative inventory to a downstream system.

8. The method of claim 7, wherein the downstream system comprises a third party system that uses the authoritative inventory.

9. A structured inventory system for automated cloud infrastructure operations using a structured inventory, comprising:
   an operational inventory module comprising unstructured data and structured data;
   an inventory event stream in communication with the operational inventory module;
   a template-based export module in communication with the inventory event stream; and
   an authoritative inventory module comprising an authoritative inventory;
   wherein:
   the operational inventory module receives the unstructured data from a data platform, wherein the unstructured data comprises unstructured inventory operational data;
   the operational inventory module transforms the unstructured data into structured data;
   the operational inventory module identifies at least some of the structured data as emerging reference data based on a request for at least some of the structured data;
   the operational inventory module provides at least some of the emerging reference data to the inventory event stream;
   the template-based export module applies a template to the inventory event stream to generate the authoritative inventory; and
   the authoritative inventory module stores the authoritative inventory.

10. The system of claim 9, wherein the platform comprises a cloud-based platform.

11. The system of claim 9, wherein the structure for the unstructured data is based on a request for the unstructured data.

12. The system of claim 11, wherein the request is from an automation tool.

13. The system of claim 9, wherein changes to the emerging reference data are provided as the inventory event stream.

14. The system of claim 9, wherein the template is created based on the emerging reference data.

15. The system of claim 9, wherein the template-based export module exports the authoritative inventory to a downstream system.

16. The system of claim 15, wherein the downstream system comprises a third party system that uses the authoritative inventory.

17. The system of claim 15, wherein the template-based export reports a success or failure of the export of the authoritative inventory.

18. The system of claim 9, wherein the template-based export validates the authoritative inventory for consistency or compatibility.

* * * * *